United States Patent
Peiker

(10) Patent No.: US 6,456,829 B1
(45) Date of Patent: Sep. 24, 2002

(54) TELEPHONE APPARATUS WITH HOLD-SECURING DEVICE

(76) Inventor: Andreas Peiker, Max-Planck-Birasse 32, D-61381 Friedrichsdorf (DE)

( * ) Notice: Subject to any disclaimer, the term of this patent is extended or adjusted under 35 U.S.C. 154(b) by 0 days.

(21) Appl. No.: 09/380,845

(22) PCT Filed: Mar. 12, 1998

(86) PCT No.: PCT/IB98/00316

§ 371 (c)(1),
(2), (4) Date: Sep. 10, 1999

(87) PCT Pub. No.: WO98/40244

PCT Pub. Date: Sep. 17, 1998

(30) Foreign Application Priority Data

Mar. 12, 1997 (DE) .................................. 297 05 230 U

(51) Int. Cl.⁷ .............................................. H04M 1/60
(52) U.S. Cl. ...................................... 455/90; 379/446
(58) Field of Search ............................. 455/90; 379/446

(56) References Cited

U.S. PATENT DOCUMENTS

| 5,230,016 A | 7/1993 | Yasuda | |
|---|---|---|---|
| 5,898,775 A | * 4/1999 | Niemo et al. | 379/446 |
| 6,208,734 B1 | * 3/2001 | Ortscheid et al. | 379/446 |
| 6,263,080 B1 | * 7/2001 | Klammer et al. | 379/446 |

FOREIGN PATENT DOCUMENTS

| DE | 4107996 A1 | 9/1992 | |
|---|---|---|---|
| DE | 97/00792 | * 1/1997 | H04M/1/60 |
| EP | 0617535 A2 | 9/1994 | |
| EP | 0751043 A1 | 1/1997 | |

OTHER PUBLICATIONS

Patent Abstracts of Japan, vol. 095, No. 008, Sep. 29, 1995 & JP 07 135521 A.
Patent Abstracts of Japan, vol. 018, No. 083 (M–1558), Feb. 10, 1994 & JP 05 294190 A.

* cited by examiner

Primary Examiner—Daniel Hunter
Assistant Examiner—Alan T. Gantt

(57) ABSTRACT

A telephone apparatus, especially for use in a vehicle. There is a mobile telephone and a receptacle device in whose receptacle space the mobile telephone can be removably held by a safety catch. The safety catch extends part way over at least one of the mobile telephone surfaces and is reliably held when hung up by and push-forward element. Mobile telephone can be brought from receptacle space out into a position where it can be grasped. The telephone instrument is reliably held in a "harsh" environment and can be dependably installed but still be picked up easily.

10 Claims, 2 Drawing Sheets

TELEPHONE APPARATUS WITH HOLD-SECURING DEVICE

This application is the national phase under 35 U.S.C. §371 of PCT International Application No. PCT/EP98/00316 which has an International filing date of Mar. 12, 1998 which designated the United States of America.

BACKGROUND

From WO97/0007920 a telephone instrument for use in a vehicle is known. The known telephone instrument had a mobile telephone (Handy) and a receptacle device with a receptacle space for the mobile telephone. The mobile telephone could be removed from this receptacle space. The mobile telephone was held by a catch located on one of the narrow sides of the receptacle space. The catch was a slide that was pushed over the antenna base that extended over the surface of the mobile telephone.

From JP-A-07 135521 another telephone instrument with a mobile telephone and a receptacle device for said telephone is known. On the lower side wall of its receptacle space for the mobile telephone, the receptacle device had a protruding spring-secured nose that was mechanically connected to a plug. When the mobile telephone was placed in the receptacle space, the lower narrow side of the mobile telephone pushed this nose back, thus causing the plug to make electrical contact. That is, the plug contacts were connected in terms of power and signals only when the mobile telephone was hung up. When the mobile telephone was picked up, this connection was broken. There was no protection, however, for the plug against dirt that might get into its plug recess.

OBJECT OF THE INVENTION

The object of the invention is to create a telephone instrument with a mobile telephone (Handy) especially for use in a vehicle which, in its "harsh" environment, can be securely held and reliably installed and can still be grasped easily for pick-up.

DESCRIPTION OF THE INVENTION

This object is accomplished by virtue of the fact that a mobile telephone that can be removed from a receptacle space of a receptacle device can be securely held by at least one catch that grips its surface area when hung up and, for pick-up after the safety is disconnected, it can be readily removed by a push-out element part way from the receptacle device to ensure a good grip. In order to ensure ease of handling, the catch is preferably located in the upper area of the receptacle device in its narrow side, i.e., adjacent to the earpiece of the hung-up mobile telephone.

The hung-up mobile telephone is preferably released by moving a catch element of the catch parallel to its longitudinal axis. In order to be able to initiate this movement, an actuation button must be depressed whose top protrudes only slightly above the surface of the catch element. The extent of the projection is selected such that the button can be readily detected by touch. Actuation (release) takes place only when the button is depressed below the upper surface of the catch element, whereby the depression travel is selected to be large enough that accidental contact will not cause actuation.

In order to keep the mobile telephone from "rattling" in the receptacle device under "harsh" ambient conditions such as occur, for example, in a moving vehicle, the telephone must rest snugly in the receptacle device. Because of differences in temperature and material between the mobile telephone and the receptacle device, the two may stick together. In order nevertheless to ensure easy pick-up, upon release for pick-up the mobile telephone is lifted a short way out of the receptacle device with a lever as a push-up element and is then put into the grip position by a compression spring that is preferably located in the receptacle device underneath the earpiece of the mobile telephone.

Electrical power and/or signals is/are transferred between the mobile telephone and receptacle device via a jack that is preferably located in the lower area of the receptacle device. In order to keep metal objects such as coins, hair clips, and paper clips from falling into this area and causing a short-circuit across the contacts of the jack, in an alternate embodiment a jack cover is provided. When the mobile telephone is picked up, the jack is always covered. Only when the mobile telephone is replaced are the contacts released.

Examples of the telephone instrument according to the invention are described in greater detail below with the aid of drawings. Other advantages of the invention emerge from the following description. Here:

BRIEF DESCRIPTION OF THE DRAWINGS

FIG. 3 shows a longitudinal section through the receptacle device with the mobile telephone hung up, on an enlarged scale compared to FIGS. 1 and 2;

DETAILED DESCRIPTION OF THE INVENTION

Figure 1:
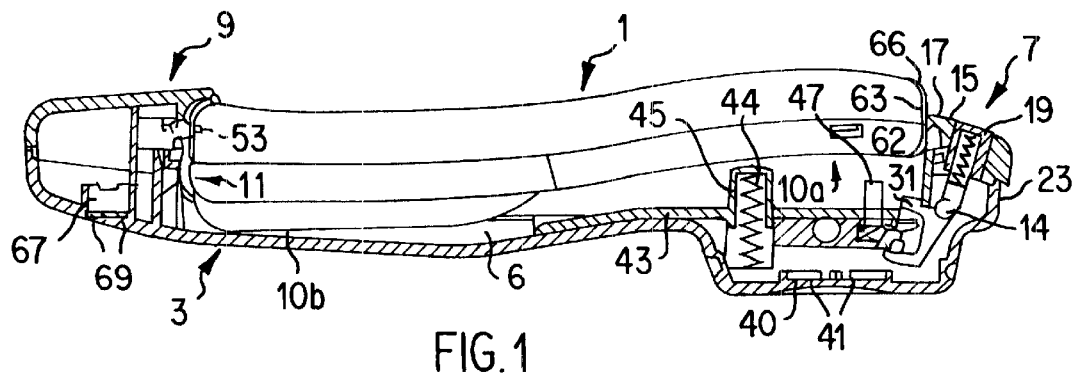
FIG. 1 shows a longitudinal section through an embodiment of a telephone instrument according to the invention with a mobile telephone already placed in a receptacle device but unlocked and already pushed forward, whereby a receptacle device securing bracket is not shown.
Figure 5:
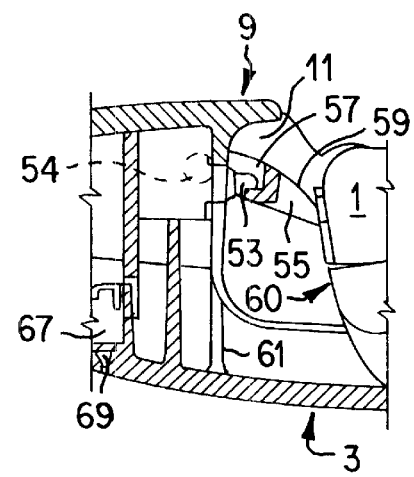
FIG. 5 shows a longitudinal section through a lower area of the receptacle device that has a jack, with the mobile telephone picked up and the jack covered.
Figure 6:
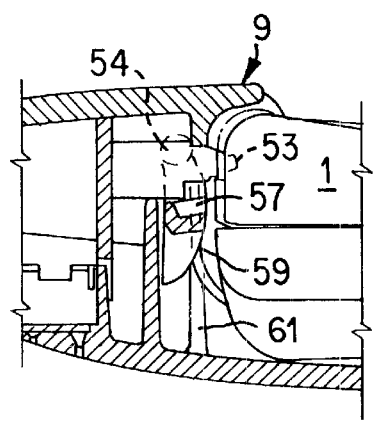
FIG. 6 shows a view similar to that of FIG. 5, but with the mobile telephone hung up.

The telephone instrument shown in FIG. 1, such as is used especially in vehicles, has a mobile telephone 1 and a receptacle device 3. Other designs of receptacle devices 3 are described in, e.g., WO-A 97/00792. Receptacle device 3 is held on the vehicle molding by, e.g., a bracket 5 in which it is detachably latched, and bracket 5 and receptacle device 3 are connected together with regard to power and signals via a cable, not shown. Bracket 5 also includes a transceiver device, not shown, for signals that are radiated from mobile telephone 1 via an antenna. Mobile telephone 1 is securely and detachably held in a receptacle space 6 of receptacle device 3 by catches 7 and 9 (FIG. 5) which lap over, respectively, its upper and lower surface areas. Catch 7 laps over a surface area on the narrow side of the earpiece part, while catch 9 extends over a surface area of mouthpiece 10a and 10b. Catch 9 is designed to be rigid and to be a recess 11 in lower area 12 of receptacle device 3 and is shown in FIGS. 5 and 6.

Figure 3:
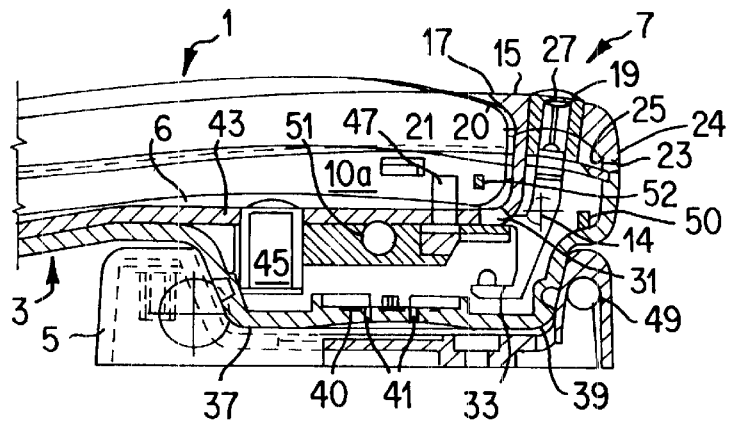
FIG. 3 shows such a bracket in cross-section.
Figure 4:
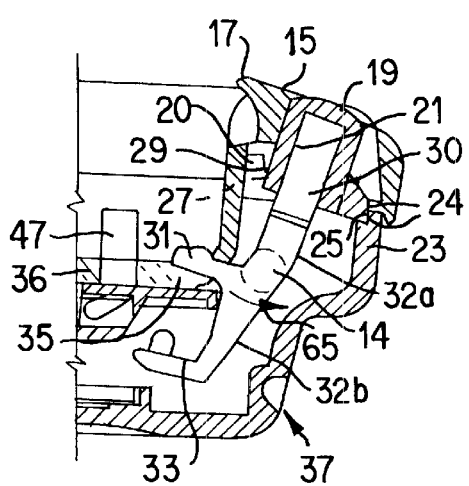
FIG. 4 shows a longitudinal section similar to that of FIG. 1, enlarged, with the mobile telephone picked up.

When mobile telephone 1 is hung up in receptacle space 6, mobile telephone longitudinal midline 13 coincides with that of receptacle unit 3 and its receptacle space 6. Catch 7 is designed to pivot around swivelling axis 14, which runs vertical to longitudinal axis 13; FIGS. 1 and 3 show catch 7 in the locked state, while FIG. 4 shows it in the unlocked state. Catch 7 has a catch element 15 with a nose 17 which, in the locked state, laps over one surface area in the narrow-side edge area of earpiece 10a. Catch 7 has a spring-mounted actuation button 19, which can be depressed into catch element 15 vertically to swivelling axis 14. The upper side of actuation button 19 protrudes far enough from the surface of catch 15 that the button surface is just able to be detected by touch. The cross-section is made large enough that it can easily be depressed into catch element 15 with one finger. The cross-section, the overlap, and the actuation travel are selected such that good detectability by touch is provided, while at the same time the possibility of accidental actuation is minimized.

Actuation button 19 has a fitting 21 which, when catch 7 is locked, extends into a groove 20 in base 23 of the upper connecting part of receptacle unit 3. Catch 7 is able to swivel only after fitting 21 is pushed out of groove 20. When actuation button 19 is depressed, fitting 21 is forced out of groove 20; see, in particular, FIG. 4. When fitting 21 is pushed out, catch 7 is able to swivel outward parallel to longitudinal axis 13 around swivelling axis 14 until it strikes lower edge 24 of catch element 15 at a recess 25 in base 23. At the same time fitting 21 catches in another groove 27. Catch 7 is secured in its open position. Unlike relatively deep and steep wall 29 of groove 20, which faces away from receptacle space 6, wall 30 of groove 27, which faces toward receptacle space 6, is less deep and is also beveled. The shape of wall 30 makes it possible, when mobile telephone 1 is hung up as described below, for fitting 21 to slip out until it again catches in groove 20.

Catch 7 is designed as a two-arm lever that can pivot around swivelling axis 14. Catch element 7 with actuation button 19 is arranged at one lever arm 32a, and at other lever arm 32b are push-forward element 31 for mobile telephone 1 and a receptacle 33 for a compression spring 34, not shown in FIGS. 3 and 4. Push-forward element 31 is designed as an extension arm that is approximately vertical to lever arm 32b and extends through an opening 35 in floor 36 of receptacle device 3 into its receptacle space 6 when mobile telephone 1 is picked up.

In its upper part receptacle device 3 is equipped on the back with a protruding, bowl-shaped projection 37. The outline of said projection 37 is adapted to trough 39 of bracket 5, described below. Said contour is preferably square with rounded corners; other shapes can, however, be used as well. Projection 37 holds an earpiece 40 with acoustically transparent channels 41 leading to its outside and is covered with respect to receptacle space 6 by a cover 43 as part of floor 36. Through cover 43, a slide 45 that is equipped with compression spring 44 protrudes to push forward released and already picked-up mobile telephone 1 from receptacle space 6. In addition, an antenna jack 47 extends through said cover 43.

Bracket 6 has ratchet-like catch elements that removably hold receptacle device 3. One of these catch elements is shown in FIG. 3 at location A. Bracket 5 also has a magnet 49, which works together with a "Reed switch" 50 of a Reed relay. The Reed relay switches to hands free operation when receptacle device 3 is placed in bracket 5.

In receptacle device 3 there is also a magnet 51, which works together with a Reed switch 52 and which, when mobile telephone 1 is hung up in receptacle device 3, disconnects the telephone's earpiece and mouthpiece and activates those of receptacle device 3.

The transfer of electrical power and/or signals between receptacle device 3 and mobile telephone 1 is effected via plug 53, which is drawn in schematically in FIGS. 5 and 6, as an interface in recess 11. Plug 53 can be covered with a plug cover 55 that is able to swivel around a swivelling axis 54. Swivelling axis 54 runs vertically to longitudinal axis 13. The plug cover is shaped like a centerboard, similar to the centerboard of a sailing ship, and can be automatically brought into the position shown in FIG. 5 by a spring, not shown. That is, by further analogy, it is like the centerboard of a surfboard. To receive plug 53, plug cover 55 has a cavity 57 that is bounded on only one side and is equipped with a "roof". Said cavity 57 can now be designed in such a way that the entire plug strip is covered by a through cavity or a chamber is formed for each contact. When mobile telephone 1 is hung up in receptacle device 3, side 59 of plug cover 55 slides along face 60 of mobile telephone 1 while swinging into an opening 61 in recess 11. After cover 55 swings in, plug 56 is released, as shown in FIG. 5.

Figure 2:
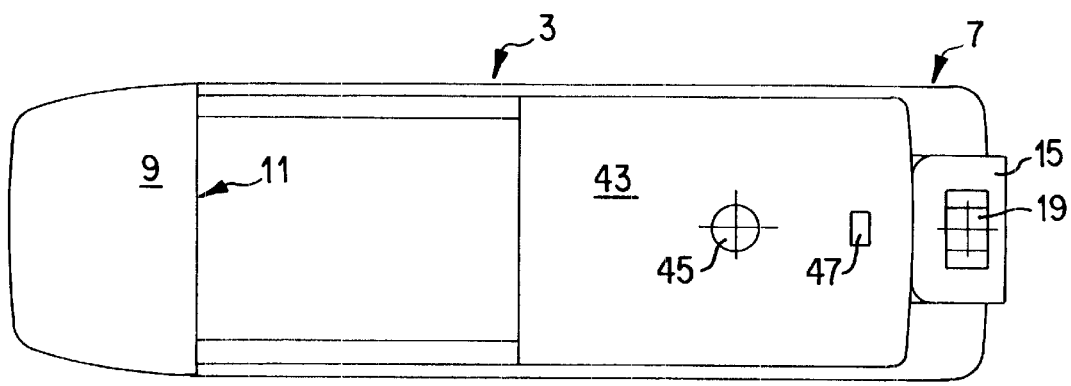
FIG. 2 shows a top view of the receptacle device of the telephone instrument depicted in FIG. 1 with the mobile telephone picked up.

After being hung up in the lower catch, completing the electrical plug circuit, the part of mobile telephone 1 that contains the earpiece is pushed into receptacle device 3. As shown in FIGS. 1, 2, and 4, catch 7 is opened. While swinging in, the first thing to be forced against floor 36 is spring-loaded slide 45, and then the circuit to the antenna plug is made. Just before the push-in motion ends, lower edge 62 of upper face 63 of mobile telephone 1 presses against push-forward element 31 and pushes it back into opening 35. The inward pushing motion causes lever arm 32b to swing in the direction of arrow 65 around swivelling axis 14; the slight holding force caused by fitting 21, which lies in groove 27, is overcome with relatively little expenditure of force because of oblique wall 30. With swivel motion 65, catch element 15 with its nose 17 is pushed over upper edge 66 of upper face 63 of mobile telephone 1, and fitting 21 catches in groove 20. Mobile telephone 1 is now securely held in receptacle device 3, and the Reed relay, which consists of magnet 51 and Reed switch 52, switches.

The electrical linkage of the two Reed relays, consisting of magnet 51 and Reed switch 52, as well as magnet 49 and Reed switch 50, is designed in such a way that, when mobile telephone 1 is hung up in receptacle device 3 and receptacle device 3 is snapped into bracket 5, the unit switches to free listening and free talking. An external microphone and an external speaker are also included. The actual mouthpiece and earpiece of the mobile telephone, as well as those of receptacle device 3, are switched off.

If receptacle device 3 is unlatched from bracket 5 and mobile telephone 1 rests in receptacle device 3, earpiece 40 in projection 37 and transmitter capsule 67 in the lower part of receptacle device 3 are activated. Transmitter capsule 67 is connected to the outside world via acoustic channels 69; the external microphone and the external speaker, as well as the earpiece and mouthpiece of mobile telephone 1, are turned off.

If mobile telephone 1 is picked up out of receptacle device 3, its earpiece and mouthpiece are activated; those of receptacle device 3, as well as the external speaker and external microphone, are turned off. This switching takes place when receptacle device 3 is latched into console 5 and mobile telephone 1 is removed.

In a preferred design of the telephone instrument, there is a switch with which the earpiece and mouthpiece of receptacle device 3 can be activated so that a second person can actively take part in a conversation that is conducted with mobile telephone 1 removed. The switch key can be, for example, slide 45 when receptacle device 3 is removed from bracket 5; this slide must then be depressed for the duration of the conversation. For this purpose slide 45 can also have a rotary lock that constantly secures it in its position that is completely inserted into floor 36 of receptacle space 6. Rotating it in the opposite direction then releases slide 45. Preferably the top of the slide will be provided with ribbing to ensure a good grip for the fingertip that is to be placed on the slide. Slide 36 catches with a depression travel that is smaller than when mobile telephone 1 is hung up. For this purpose as well, a switch can be placed on the lower part of the receptacle device. Thus, a key or key sequence on the mobile telephone can be used for switching; this would have the advantage that the second person involved in the conversation would not be able to intervene directly therein without permission.

Figure 8:
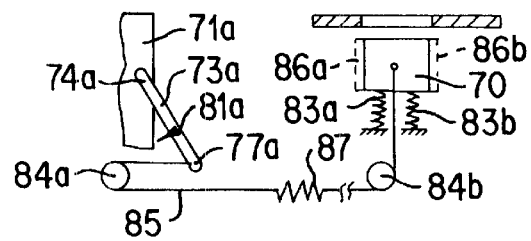
FIGS. 7 and 8 show a schematic of a variant of a jack cover.
Figure 7:
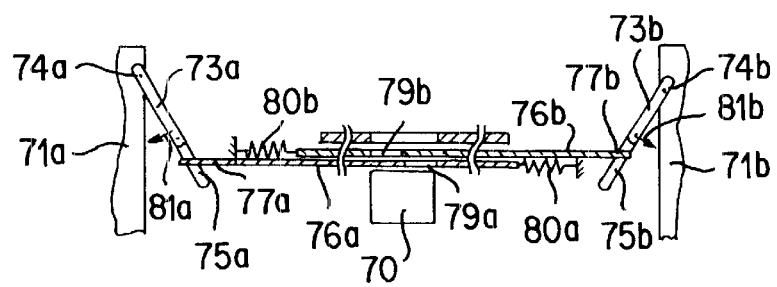

Instead of plug 53 being placed in the lower part of receptacle device 3, it can also be combined with upper catch 7, in which case the process of plugging them together would begin with the movement of the catch element. Another option for plug protection is shown in FIGS. 7 and 8. For the sake of clarity, the cover function in FIG. 6 is shown in FIG. 7 separately from a push-out function of a plug 70 located in the lower part of the receptacle device.

According to the variant embodiment shown in FIGS. 6 and 7, when mobile telephone 1 is picked up, a recess similar to recess 11 has swing-in tongues 73a and 73b in its lateral walls 71a and 71b. Tongue pivot bearings 74a and 74b are arranged inside of walls 71a and 71b. The ends of the tongues that face away from pivot bearings 74a and 74b lie under the floor of the recess. Shift plates 76a and 76b are movably held against them by shafts 77a and 77b in longitudinal slots 75a and 75b. Both shift plates 76a and 76b have a slot 79a and 79b, whose length is one tolerance larger than half the width of plug 70. The width of the slot is one tolerance larger than the thickness of plug 70. Both shift plates 76a and 76b are pushed by springs 80a and 80b against the ends that face shafts 77a and 77b. FIG. 7 shows the components in one position with mobile telephone 1 picked up. When mobile telephone 1 is picked up, openings 79a and 79b lie in such a way that the top side of plug 70 is covered in the recess and is protected from spray water.

If lower face 60 of mobile telephone 1 is now pushed into the recess, tongues 73a and 73b, which are arranged in walls 71a and 71b, are depressed in the direction of arrows 81a and 81b against the force of springs 80a and 80b. This causes shift plates 76a and 76b to shift until two slots 79a and 79b come together, one above the other. Plug 70 is now free to receive the other coupling part in lower face 60 of mobile telephone 1.

The shift function of plug 70, whereby as a variant a sleeve can also be used here, is illustrated with the aid of the schematic diagram in FIG. 8. This figure also shows the state of plug 70 when mobile telephone 1 is picked up. In this case plug 70 is held in a position below the floor of the recess against the force of compression springs 83a and 83b, which are located on both sides. Two slots 79a and 79b in the shift plates are, as FIG. 6 shows, in a position protected against spray water. Tongue 73a, which is shown in FIG. 8 (identical to the tongue shown in FIG. 6), is held in the indicated position by the force of spring 80a (FIG. 7). A cable control which is reversed via two rollers 84a and 84b is guided by shaft 77a (identical to the shaft in FIG. 6) to plug 70. Plug 70 is movably guided vertically to the floor of the recess in two longitudinal guides 86a and 86b. Longitudinal guides 86a and 86b can be, e.g., the edges in a plate. Cable control 85 is kept under tension by a spring 87 that is inserted into it.

If lower face 60 of mobile telephone 1 is now pushed in, then, as already indicated, tongue 73a will move in the direction of arrow 81a. This would make it possible for plug 70 to be pushed upward by the force of springs 83a and 83b. This is not yet possible, however, since two slots 79a and 79b have not yet released the full cross-section of the plug part. The freed-up cable-control travel of cable control 85 is taken up by spring 87. only when both slots 79a and 79b have been moved far enough by the inward pushing motion does plug 70 move upward into the passing coupling part in lower face 60 of mobile telephone 1.

To avoid this delayed second movement, a third tongue can be used to move plug 70. In this case the three tongues are no longer equipped with a straight insertion line, but rather have a curved path that is adapted to the required motions.

Instead of the above-described mechanical protection arrangement, a rubber-elastic protection device that keeps out spray water can also be used. The coupling part that is located in the lower part or elsewhere also has a protective wall that faces outward. This protection device consists, in simplified terms, of a fluid-filled bubble under pressure that has a diaphragm in the area of the lower opening in the protective wall. The wall of this bubble consists of an elastic material. The coefficient of elasticity of the diaphragm is smaller than that of the rest of the bubble wall. Because of the bubble pressure, this diaphragm slides into the free area of the protective wall and thus seals the contacts surrounded by the protective wall against spray water. When lower face 60 of mobile telephone 1 is plugged into the lower part, its coupling part forces the diaphragm out of the free space of the protective wall.

Depending on the design of mobile telephone 1, the coupling for the transmission of signals and/or power in the lower part of receptacle device 3 can be located on the side or elsewhere. The coupling parts may be designed in such a way that the transfer of the signals and/or power takes place without contact, especially by induction or via electromagnetic waves. Inductive transfer is selected especially for power transfer, for example, to a battery in the mobile telephone. However, the communications signal could also be transmitted in this way. Electromagnetic waves, especially visible and infrared light, will be used to transmit communications and control signals. For this purpose transceiver diodes, which are separated from one another by only a transparent window, will be installed in the mobile telephone and in the recess or in the area surrounding it. The window serves as a shield to keep out liquids and/or foreign objects. In this embodiment there is also excellent protection when the mobile telephone is hung up. This structure can also easily be designed to be water-tight, especially in a connection with inductive power transfer.

What is claimed is:

1. A telephone apparatus, especially for use in a vehicle, with a mobile telephone comprising:
   a receptacle device in whose receptacle space the mobile telephone can be removably and reliably held by at least one safety catch that is arranged at one of a narrow side of the receptacle space, the safety catch has at least one catch element which, when the phone is hung up in the receptacle space, automatically part way covers one of the surface areas of the mobile telephone and which, to release the telephone, is effective to be pushed and to be pivoted outward in the direction of the mobile telephone's longitudinal axis, and a push-forward element which brings mobile telephone from receptacle space out into a position where it can be grasped, so that the mobile telephone can be held and released without a latching hole in the mobile telephone.

2. The telephone apparatus according to claim 1, wherein a movable catch element is mechanically locked in the holding position by a locking device which locks automatically when the mobile telephone is hung up in the receptacle space of the receptacle device.

3. The telephone apparatus according to claim 1, wherein a safety catch, which has a movable catch element, has on its upper surface an actuation button to activate a holding lock, whereby the top side of said button protrudes just far enough to be detectable by touch but cannot be accidentally activated by contact with an approximately flat object, and the cross-section of said button is large enough that for actuation it can be depressed with one finger below the surface of the catch element.

4. The telephone apparatus according to claim 1, wherein the safety catch, which holds the movable catch element, has the push-forward element, which lifts the mobile telephone when it is to be released in order preferably to overcome its sticking to the sides in receptacle space and/or to overcome contact sticking in a removable plug (53, 70) and, when the mobile telephone is hung up, it exerts its action on the push-forward element in order to bring the movable safety catch into an automatically locking position.

5. The telephone apparatus according to claim 1, including a slide which is spring-mounted in the receptacle space and which, when released by the movable safety catch, lifts the mobile telephone out of receptacle device into a position where it can be readily grasped.

6. The telephone apparatus according to claim 1, including a holding bracket which can be attached to the vehicle molding and into which receptacle the device can be latched, as well as sensors, which detect when mobile telephone is hung up in receptacle device and/or when it is hung up in the bracket and actuate or turn off a switch corresponding functions, in which case the corresponding message sensor is preferably a Reed relay.

7. The telephone apparatus according to claim 1 including a separable interface to transmit electrical power and/or signals between the mobile telephone and the receptacle device, a spring-loaded plug cover, which is located in the receptacle device and can be brought over the plug, to protect the plug contacts when the mobile telephone is removed from receptacle device, and a case plug cover which has an actuation part which extends into receptacle space of receptacle device and which, by means of the plug-in motion of mobile telephone into receptacle space, releases the contacts for connection to the mobile telephone.

8. The telephone apparatus according to claim 7, wherein a plug cover is effective as a lock that can pivot around an axis and has a cavity which is hollow on one side and which, in the swung-out position, receives the contacts and has a protruding nose to rest against a bottom side of the mobile telephone, as well as in a recess in the lower edge area of receptacle space so as to swing in when mobile telephone is hung up.

9. The telephone apparatus according to claim 1, wherein the receptacle device has an earpiece and/or a mouthpiece which can be activated when the mobile telephone is removed so that another person can take part in the conversation being conducted with the mobile telephone.

10. The telephone apparatus according to claim 2, wherein the movable catch element includes means for moving outward and parallel to the longitudinal axis so that it pivots to release the mobile telephone.

* * * * *